(12) United States Patent
Bureller

(10) Patent No.: US 7,876,787 B2
(45) Date of Patent: Jan. 25, 2011

(54) METHOD FOR MONITORING THE STATE OF A DEVICE IN A NETWORK AND DEVICE FOR CARRYING OUT SAID MONITORING

(75) Inventor: Olivier Bureller, Liffre (FR)

(73) Assignee: Thomson Licensing, Boulogne Billancourt (FR)

( * ) Notice: Subject to any disclaimer, the term of this patent is extended or adjusted under 35 U.S.C. 154(b) by 874 days.

(21) Appl. No.: 10/579,889

(22) PCT Filed: Nov. 26, 2004

(86) PCT No.: PCT/FR2004/003038

§ 371 (c)(1),
(2), (4) Date: May 18, 2006

(87) PCT Pub. No.: WO2005/055537

PCT Pub. Date: Jun. 16, 2005

(65) Prior Publication Data

US 2007/0088859 A1    Apr. 19, 2007

(30) Foreign Application Priority Data

Nov. 28, 2003  (FR) .................................. 03 50931

(51) Int. Cl.
*H04J 3/06* (2006.01)
*G01R 31/08* (2006.01)
(52) U.S. Cl. ...................................... 370/503; 370/235
(58) Field of Classification Search ................. 370/503, 370/235
See application file for complete search history.

(56) References Cited

U.S. PATENT DOCUMENTS 5,742,623 A * 4/1998 Nuber et al. ................. 714/798
6,249,322 B1 * 6/2001 Sugihara ..................... 348/634
6,430,629 B1   8/2002 Smyers
6,512,767 B1   1/2003 Takeda et al.

(Continued)

FOREIGN PATENT DOCUMENTS

DE            19835668        2/1999

(Continued)

OTHER PUBLICATIONS

Search Report Dated May 9, 2005.

*Primary Examiner*—Derrick W Ferris
*Assistant Examiner*—Angel Brockman
(74) *Attorney, Agent, or Firm*—Robert D. Shedd; Joseph J. Opalach; Reitseng Lin

(57) ABSTRACT

The invention relates to a method for monitoring the state of a device within a communication network comprising at least two devices, the network comprising isochronous communication channels transmitting data packets synchronized by a signal emitted by the network emitted in regular time intervals. The method comprises at the level of a first device desiring to be monitored a step of emission by the device being monitored of data packets on a specified isochronous channel in response to the signal emitted regularly by the network. The method also comprises at the level of a second device a step of monitoring the emissions of data packets emitted on the isochronous channel and a step of executing a specified task, consequent upon the absence of data packets on the isochronous channel between at least two emissions of synchronization signals.

The invention also relates to a device for the implementation of the method.

12 Claims, 4 Drawing Sheets

U.S. PATENT DOCUMENTS

| | | | |
|---|---|---|---|
| 6,738,943 B1 * | 5/2004 | Jen | 714/756 |
| 6,751,687 B1 * | 6/2004 | Sato et al. | 710/62 |
| RE39,763 E * | 8/2007 | Staats et al. | 710/107 |
| 2002/0041547 A1 * | 4/2002 | Katayama et al. | 369/47.24 |
| 2002/0047862 A1 * | 4/2002 | Aoki et al. | 345/736 |

FOREIGN PATENT DOCUMENTS

EP    1185034    3/2002

* cited by examiner

ICCU

METHOD FOR MONITORING THE STATE OF A DEVICE IN A NETWORK AND DEVICE FOR CARRYING OUT SAID MONITORING

This application claims the benefit, under 35 U.S.C. §365 of International Application PCT/FR2004/003038, filed Nov. 26, 2004, which was published in accordance with PCT Article 21(2) on Jun. 16, 2005 in French and which claims the benefit of French patent application No. 0350931, filed Nov. 28, 2003.

FIELD OF THE INVENTION

The invention relates to a method for monitoring the state of a device connected to a domestic network and a detection device for the monitoring via a network of another device.

BACKGROUND

A digital communication network comprises devices linked together by a communication bus, for example the IEEE 1394 bus, using wires or waves. The communication network comprises, for example, the following devices: a terminal allowing users to display audiovisual emissions, to enter parameters for controlling the network and to ascertain the state of the network, a digital television receiver (a decoder for example) capable of receiving audiovisual emissions and service information originating from a transmission network, a device for storing the audiovisual emissions, a modem, etc. The list of devices is not exhaustive, likewise there may be several of some devices within the communication network, for example a camera in each child's room.

The 1394 network enables devices to communicate according to three different modes: the synchronous mode where the data packets are emitted regularly at the end of determined time periods, the asynchronous mode where each message is isolated from the others and can be emitted at any moment, the isochronous mode where the data packets are emitted regularly in a determined time bracket. These various communication modes are used for the transfer of specific data. Commands are generally transmitted in asynchronous mode, data transmitted in synchronous mode, and stream data internal to the network in isochronous mode. In the latter case, we find monitoring data emitted by a camera disposed in a child's room, a television displaying said data. In contradistinction to the audiovisual data received from a transmission network and subjected to very precise and regular synchronizations, such a monitoring need only receive an image from time to time, at moments which can vary.

The monitoring of proper networked device operation is generally performed by a device inherent in the device. We find for example "Watchdog" devices, which triggers an error message when at the end of a timer, the central unit being monitored has not performed a certain action. This device must quite obviously be more reliable than the central unit that it is charged with monitoring. Each device being monitored must possess its own device, the present invention makes it possible among other advantage, to limit the number of monitoring devices while being able to monitor a significant number of devices.

The document U.S. Pat. No. 6,430,629 B1—SMYERS, published on 6 Aug. 2002 describes a 1394 network, and the possibility of monitoring the temperature of rooms by virtue of modules communicating with the aid of this network. The invention relates more precisely to the "monitoring" of the state of a device of a network. A screen indicates the device state such as a VCR or an STB, and the temperature of the room. Claim 1 indicates that the network monitor periodically receives information indicating the state of the devices.

The document EP 1 185 034—SONY teaches error detection in a network, for example 1394, emission loop. A device of the network is configured to detect connection errors on an isochronous channel, the error detection is performed inter alia by polling of the signals "IEEE 1394 signal S1". Other detections can be performed by analyzing the regularity of emission of the data packets thereby defining a priority level in the error and a specific action, for example the display on a screen of the error detection. This document teaches a device exercising monitoring on all the communications of the network and not specifically on a device desiring to be monitored.

SUMMARY OF THE INVENTION

The present invention consists of a method for monitoring the state of a device within a communication network comprising at least two devices, the network comprising isochronous communication channels transmitting data packets synchronized by a signal emitted by the network emitted in-regular time intervals; characterized in that it comprises the following steps:
At the level of a first device desiring to be monitored:
Emission by the device being monitored of data packets on a specified isochronous channel in response to the signal emitted regularly by the network;
At the level of a second device:
monitoring of the emissions of data packets emitted on the isochronous channel;
Execution of a specified task, consequent upon the absence of data packets on the isochronous channel between at least two emissions of synchronization signals.

In this way, the monitoring of the state of a device fully uses the resources of the network by utilizing the synchronization signals of the isochronous emissions and by making use thereof to detect the premature end of the data emissions on such channels.

According to a first refinement, the method comprises a step of emission of a monitoring request containing an identifier of the isochronous channel transmitting the packets and a task descriptor. In this way, the device to be monitored informs the device charged with the monitoring of what it must do in the event of malfunction.

According to another refinement, the monitoring request specifies a predetermined number of synchronization signals. In this way, the monitoring device awaits the detection of the predetermined number of signals to trigger the execution of the specified task.

According to another refinement the method comprises a step of emission by the second device of a handling signal following the reception of the monitoring request. Thus, the device which requests to be monitored knows that this monitoring is undertaken by a device of the network.

According to another refinement, the specified task comprises the display of an alert message comprising an identifier of the first device. Thus the users of the network can be warned of a malfunction.

According to another refinement, the specified task comprises a step of analysis of the reason for the stoppage of the emissions of data packets, and a step of executing actions so as to resume the emission of the data packets. In this way, the devices of the network can automatically eliminate the causes of some malfunctions.

The subject of the invention is also a network device charged with monitoring the state of at least one other device of the network, comprising a means of communication with a network sensing synchronization signals allowing the emission of isochronous data and isochronous data packets emitted on a specified isochronous channel; characterized in that it furthermore comprises a means for executing a specified task consequent upon the absence of data packets on the isochronous channel between at least two emissions of synchronization signals, the absence of packets being indicative of the state of the device being monitored.

BRIEF DESCRIPTION OF THE DRAWINGS

Other characteristics and advantages of the present invention will emerge from the description of the exemplary embodiments which will follow, taken by way of no limiting examples, with reference to the appended figures in which.

DETAILED DESCRIPTION

Figure 1:
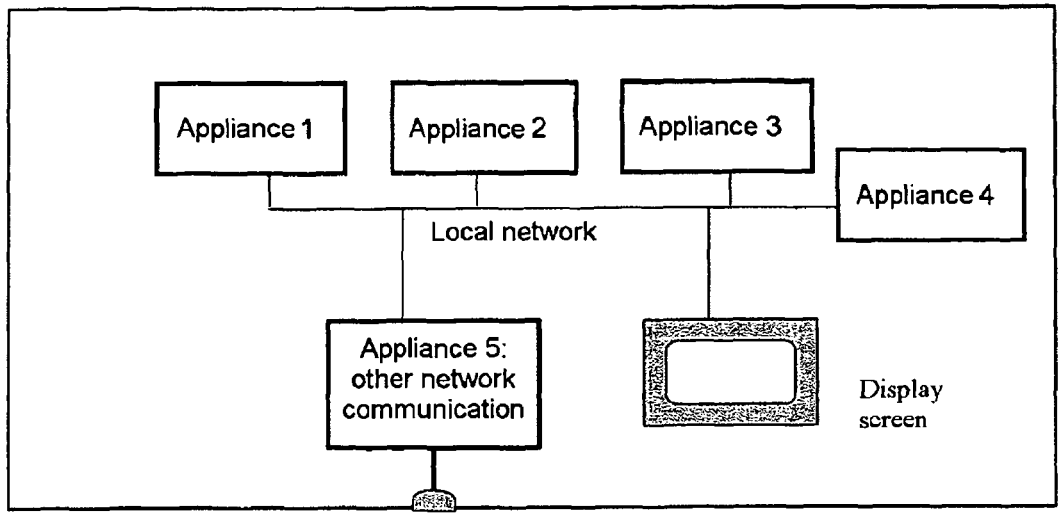
FIG. 1 represents a block diagram of a known local network.

With the aid of FIG. 1, we shall first of all describe a local digital communication network according to the current state of the art. This network for example comprises the following devices:

Device 1: a camera;

Device 2: a computer equipped with a DVD disk reader, an interface with the telephone network (typically a modem) and an integrated decoder;

Device 3: an STB decoder furnished with a tuner and a demultiplexer DEMUX making it possible to receive emissions of a transmission network and a memory (typically a hard disk) making it possible to store the programs and data received from the transmission network;

Device 4: a digital video recorder;

Other devices (not represented) are possible within the framework of the invention: a viewing screen, an analog video recorder, temperature sensors for the regulation of heating and fire detection, motion detectors for detecting the presence of individuals with a view to alarm. All these devices are linked together by a digital bus using the 1394 IEEE standard. According to this standard, the devices communicate together in an asynchronous or isochronous manner. An isochronous communication makes it possible to transmit an uninterrupted stream of data between for example, a camera and a screen displaying the video signals of the camera, a temperature sensor transmitting information to the heating plant. An isochronous channel possesses the feature of regularly transmitting data from an emitter to a receiver in a time bracket defined by a determined bandwidth. The node of the network called the clock Master (or "Cycle Master") is aimed at guaranteeing a regular timing of the isochronous packets emitted on the channels. For this purpose, the Master node emits to all the other nodes of the network a cycle start signal every 125 milliseconds. This signal serves as synchronization for emitting the data packets. The network also comprises a device furnished with a software resource called the Isochronous Resource Manager (IRM). The IRM module manages a memory where the identifiers of the various active isochronous channels as well as the bandwidths are recorded. For this purpose, the IRM is furnished with bandwidth allocation and channel allocation registers. The IRM allows the management of the isochronous channels and of the bandwidth available on the network. The control of the isochronous channels is in a favored manner devolved to the clock Master.

Figure 2:
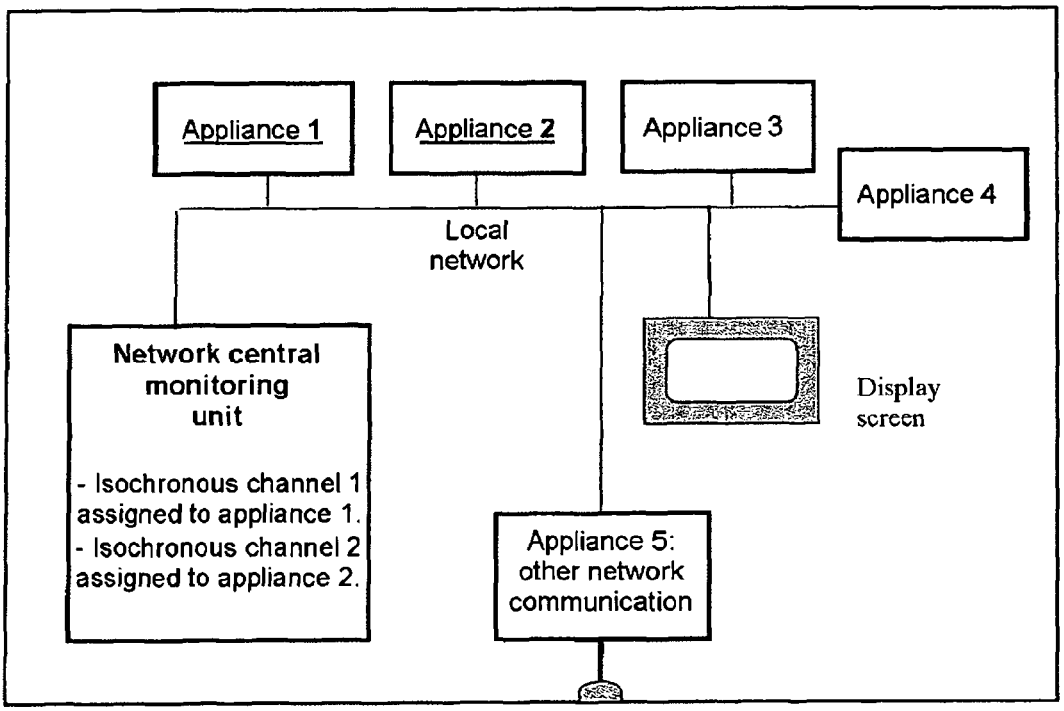
FIG. 2 represents the block diagram of a network according to an exemplary embodiment of the invention.

According to a preferred exemplary embodiment of the invention, the network also comprises an Isochronous Channels Control Unit (ICCU for short and for the rest of the document). The ICCU is furnished with the network watchdog function which ensures the monitoring of the various isochronous channels activated in the local network. An ICCU is any one of the devices connected to the network: the clock Master node, the device possessing the IRM, or another node of the network) the one possessing and equipped with a monitoring module according to a preferred exemplary embodiment of the invention. According to a variant, an ICCU is a specific device charged with the monitoring of the isochronous channels, it is implemented in the network as shown in FIG. 2.

We shall now detail the conduct of the monitoring by an ICCU. A device of the network must execute an important task, therefore its execution is monitored by an ICCU. A task is in a favored manner a program executed by a Central Unit, this can also be sequential logic embedded in a specialized circuit, an ASIC for example. In the normal conduct of the task to be monitored, care will have been taken to implement the specific emission of data on a determined isochronous channel. What is important is not in the content of the data but in the periodicity of the emissions. It will therefore be possible advantageously to dispatch very short packets. The smallest isochronous packet emitted on a IEEE1494 network being made up of an isochronous header and of a nibble. These data are contained in 528 allocation units, thereby representing duration of 10 microseconds. In the step of initializing the task to be monitored, the device will program the ICCU to monitor its operation, then the ICCU will monitor the emissions on the isochronous channel.

Figure 3:
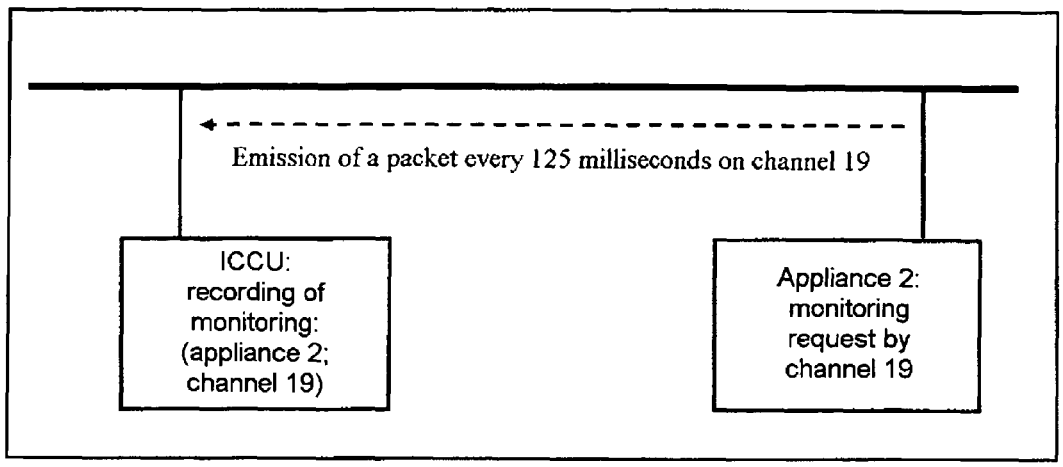
FIG. 3 represents the dispatch of a request for monitoring a first device to an Isochronous Communications Control Unit.
Figure 4:
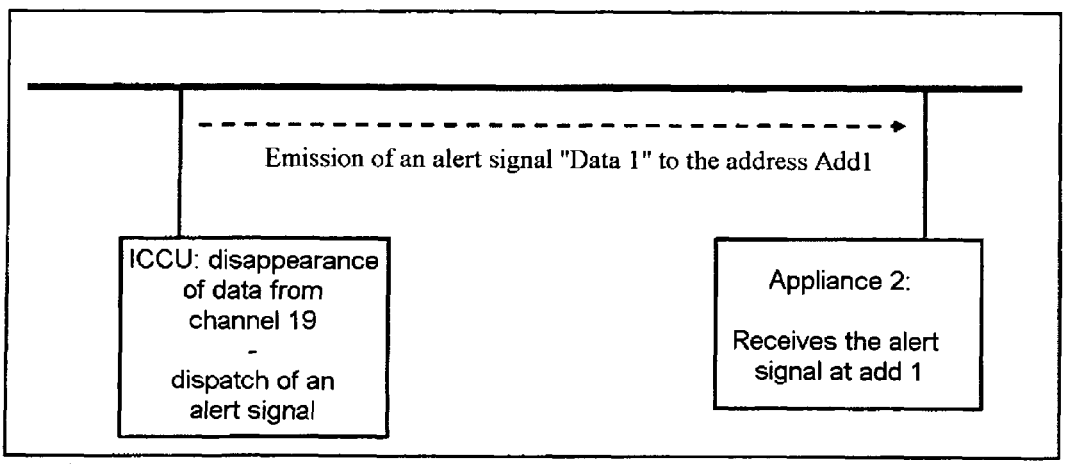
FIG. 4 represents the processing of a monitoring request by an Isochronous Communications Control Unit.

As illustrated by FIG. 3, a device 2 dispatches a monitoring request comprising its identifier, the identifier of an isochronous channel, channel 19 for example, attesting to the proper operation of the device, and a descriptor of the task to be performed if the data emitted on this channel disappear. The ICCU receives the request, records the parameters and commences the monitoring by polling the data packets emitted on the specified channel. If the network comprises several ICCUs, the first ICCU available emits on the network a message of consideration of the monitoring with the characteristics, records in its memory the parameters and immediately commences the monitoring. The other ICCUs which sense this handling message, do not concern themselves with this monitoring. The data must be emitted every 125 microseconds. During an interrupt of the emissions as is illustrated by FIG. 4, the ICCU searches in its memory for the parameters of the alert task that it must perform. For example, this task is the emission of a datum "data1" to an address "add1" of the network. This address can be the device 2, specifically if this device is furnished with a multitask system, the one triggering the emission of the isochronous packets can be interrupted but not the one managing the reception of the data of the network. In this way, the device 2 can be forewarned from outside of an internal malfunction. The address can also be another device of the network, a viewing terminal for example, the datum "data1" is then a displayable message. The viewing terminal then displaying the alert message for the attention of a user.

The monitoring requests dispatched to an ICCU contain inter alia the following information:
- identifier of the device emitting the monitoring request,
- number of the isochronous channel: 1, 2, etc. (or identifier of the data packets),
- maximum inter-packet duration of the isochronous channel, or maximum number of emission of cycle start signals before execution of the alert task,
- alert task descriptor.

The descriptor of the alert task describes the various actions of the ICCU performed during the detection of the disappearance of an isochronous channel. Here are various actions that may be in an alert task:
- emission of a warning message: "Disappearance of channel 1" destined for all the screens of the residence. The message is dispatched in an asynchronous manner to each display device,
- emission of a sound signal by the ICCU,
- triggering of a programmed succession of actions to alleviate the malfunction detected by the ICCU.

The alert task is stored and dispatched as is on the network. If the device being monitored does not specify any alert task, the ICCU possesses a default task consisting in displaying on a screen of the network all the available parameters to inform a user of the malfunction. The message displayed is for example "at 20.30, interrupt of the emissions on isochronous channel 2 originating from device 1". The user can thus intervene on the device 1 and reinstate the task properly.

A variant consists in the device being monitored defining precisely the alert action and informing the ICCU thereof. For example, a user programs the recording of an emission on digital channel 21, this channel being provided by a decoder receiving the signals of a transmission network, the recording task executed on a recording device is monitored by an ICCU. At the moment of reception of the emission, the recorder device programs the decoder to receive the emission and records the first data packets received through the network. Let us assume that the receiver ceases to emit, the recording task is then interrupted. The ICCU detects at the end of the timeout an interrupt of the recording task, the descriptor specifies that it must display a following message on the screen of the lounge: "premature end of recording at 20.30" where 20.30 being a variable updated by the ICCU. A refinement consists in the descriptor received by the ICCU possessing several actions to be undertaken as a function of the analysis of the causes of the malfunction. According to the previous example and this refinement, the descriptor received by the ICCU makes provision to analyze the presence of audiovisual data packets originating from channel 21 in the course of each determined duration. If no packet is detected, the ICCU calls a second decoder and dispatches to it a request to receive channel 21. If the request is accepted, recording continues normally on the basis of the data emitted on the domestic network by the second decoder. If on the other hand no decoder is available, the ICCU displays on a screen a message indicating the premature end of recording on account of an unavailability of a decoder. In this way, the ICCU can alleviate certain malfunctions so as to maintain a recording within the local network by fully using the available resources.

Figure 5:
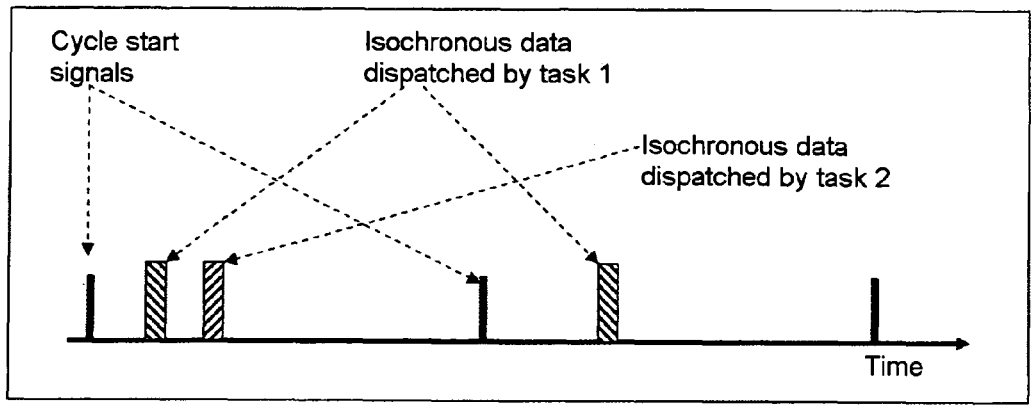
FIG. 5 represents a flowchart showing the operation of an Isochronous Communications Control Unit controlling two isochronous channels.

FIG. 5 illustrates the chronology of two tasks monitored by an ICCU. A device 1 executing a task 1 dispatches a data packet on isochronous channel 1 and a device 2 executing a task 2 dispatches another data packet on the isochronous channel T2. The ICCU monitoring the two channels, synchronizes itself with the cycle start signals emitted by the clock Master. The ICCU detects the presence or the absence of isochronous packets emitted by each of the channels being monitored between two cycle start signals. A second data packet is emitted on channel 1, therefore the task executed by the device 1 operates correctly. On the other hand, no data packet is emitted on channel 2 before the emission of a third cycle start signal. Therefore, when this third cycle start signal is detected, the ICCU deduces therefrom that channel 2 is no longer supplied and that task 2 executed by device 2 is no longer operating correctly. It instigates the alert task corresponding to the malfunction of task 2 on device 2. The example described previously does not exclude from the present invention the case where both tasks 1 and 2 are executed within the same device.

Figure 6:
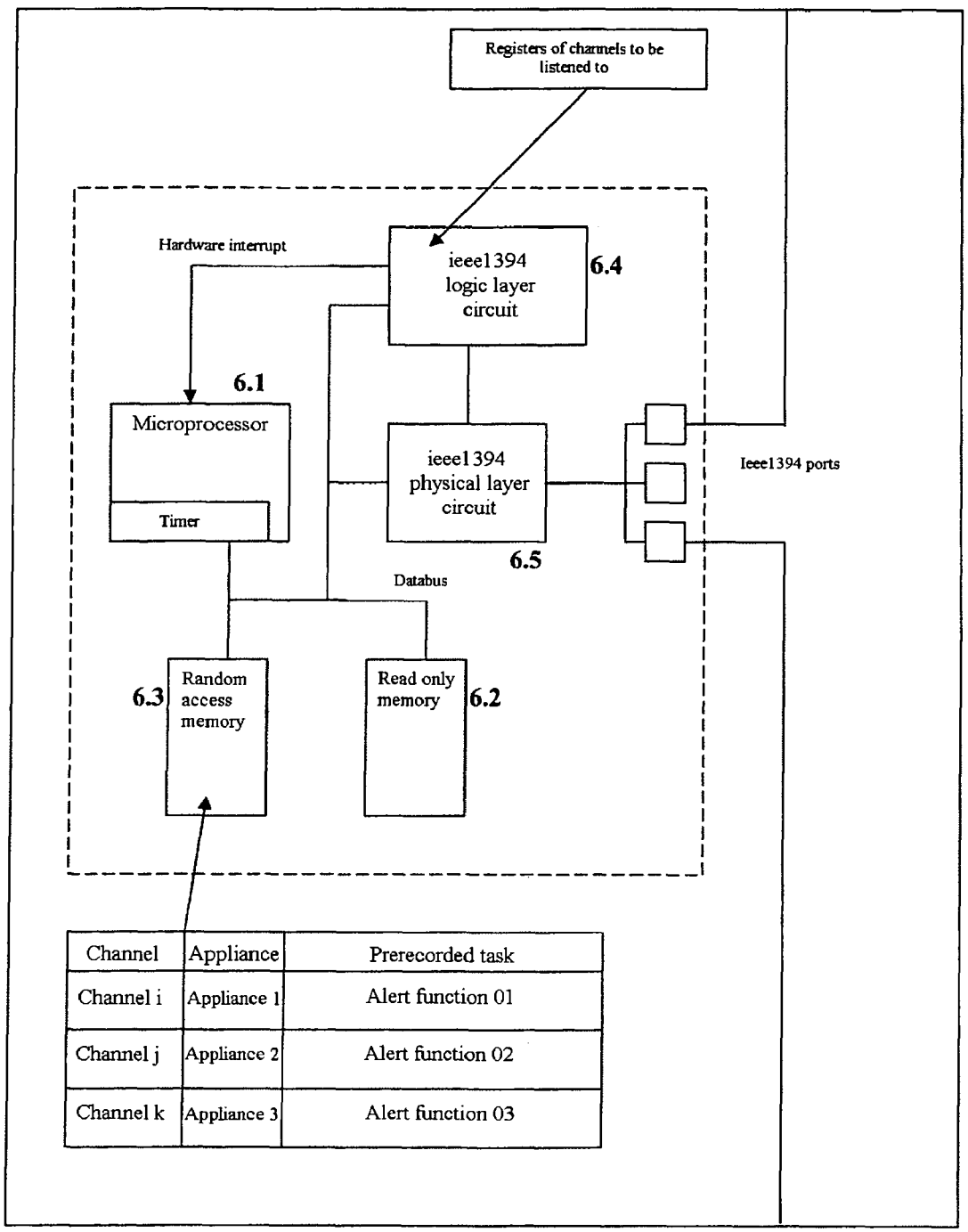
FIG. 6 represents the diagram of an Isochronous Communications Control Unit according to an exemplary embodiment of the invention.

A refinement consists in the ICCU expecting a predetermined number of emissions of cycle start signals before triggering the action described in the descriptor. Advantageously, this predetermined number is fixed by the device which desires to be monitored and is transmitted in the alert task descriptor. This refinement makes it possible to economize on bandwidth by allowing the device being monitored to dispatch an isochronous data packet only after a determined number of cycle start signals. For this purpose, the Central Unit contained in the ICCU has available a counter and the counting datum for each isochronous channel is placed in a new column of the array recorded in RAM memory, An exemplary embodiment of an ICCU is described in FIG. 6. Whether an ICCU is physically a standard device furnished with a specific program or a device dedicated to monitoring, its general structure is the same. An ICCU possesses a central Unit 6.1, connected to a ROM memory 6.2 in which is registered at least the monitoring program, a RAM memory 6.3 for the storage of the programming data, a logic interface circuit 6.4 for communication with the IEEE 1394 bus and a hardware interface circuit 6.5 for interfacing with the 1394 network.

The interface circuit 6.4 supports the management of isochronous channels. This circuit constantly monitors the data of the local network and with the aid of digital filters, extracts certain packets according to their identifiers. In this way, a receiver can permanently receive data emitted on an isochronous channel, without needing to fetch. them. The interface circuit 6.4 is for example a TSB43AB22 circuit manufactured by the company Texas Instruments. This circuit generates a hardware interrupt on receipt of a data packet which acts on the conduct of the program executed by the central unit 6.1. This circuit can discriminate the channel by virtue of two interrupt mask registers which specifies the references of said channel, thereby making it possible to filter the isochronous channel or channels to be monitored. This circuit is compatible with the IEEE1394 standard. The RAM memory 6.3 records the data corresponding to the various monitorings of the isochronous channels used. These data (channel identifier, device identifier, alert task descriptor, cycle start signal counter, etc.) are disposed in an array.

Figure 7:
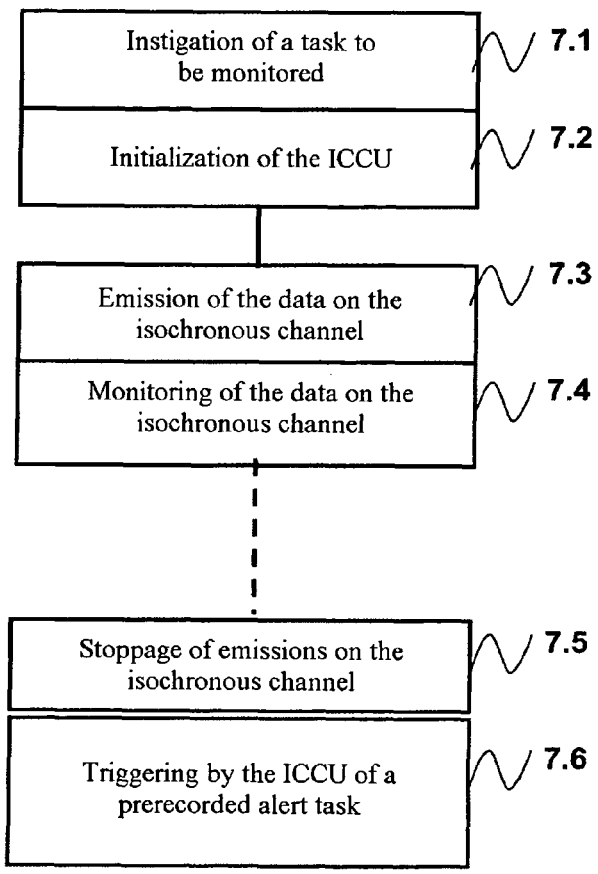
FIG. 7 represents a flowchart showing the main steps of the method according to an exemplary embodiment of the invention.

With the aid of the flowchart of FIG. 7, we shall now detail the succession of the steps according to an exemplary implementation of the invention. In step 7.1 a device of the network instigates a task which needs to be monitored. It then emits a request to an ICCU of the network specifying the isochronous monitoring channel and the action to be undertaken if the emissions are stopped (step 7.2). In step 7.3, the device of the network which is being monitored begins regularly emitting data packets on the isochronous channel. The ICCU analyzes each packet of the network and verifies that each device being monitored does indeed emit at least one data packet between two (or a determined number of) cycle start signals (step 7.4). Let us assume that a device stops its emissions (step 7.5). During the reception of the next cycle start, the ICCU notes the stoppage of the emissions on the specified isochronous channel and instigates the execution of the programmed task (step 7.6).

A variant consists in equipping the ICCU with an interpreter. In this way, it is possible to program the alert action in a language which is interpreted by the ICCU (for example: QUICK BASIC) and which makes it possible to precisely define the actions to be performed.

The exemplary embodiments of the invention presented above have been chosen for their specific character. It would not be possible however to catalog in an exhaustive manner all the embodiments that this invention covers. In particular, any step or any means described may be replaced by an equivalent step or means without departing from the scope of the present invention.

The invention claimed is:

1. A method for monitoring the state of a first device within a communication network comprising at least two devices, the network comprising isochronous communication channels transmitting data packets synchronized by a synchronization signals emitted by the network in regular time intervals, the method comprising:
    emission by the first device of data packets on an isochronous channel in response to the synchronization signals emitted by the network;
    emission by the first device of a monitoring request containing an identifier of the isochronous channel and a task descriptor specifying a task;
    reception by a second device of the emissions of data packets on the isochronous channel; and
    triggering by the second device of the execution of the specified task consequent upon the absence of data packets on the isochronous channel between at least two emissions of synchronization signals.

2. The method of claim 1; wherein the second device executes the task thus specified by the first device.

3. The method of claim 2; wherein the monitoring request specifies a predetermined number of synchronization signals; the second device executing the specified task when no data packet has been detected on the isochronous channel following the detection of the specified number of synchronization signals.

4. The method of claim 2; wherein it comprises a step of emission by the second device of a handling signal following the reception of the monitoring request.

5. The method of claim 1; wherein the specified task comprises the display of an alert message comprising an identifier of the first device.

6. The method of claim 1; wherein the specified task comprises a step of analysis of the reason for the absence of data packets, and a step of executing actions so as to resume the emission of the data packets.

7. A network device charged with monitoring the state of at least one other device of the network, comprising:
    a means of receiving a monitoring request containing an identifier of an isochronous channel of the network on which the at least one other device whose state is being monitored emits data packets and a task descriptor specifying a task, the means of receiving also receiving synchronization signals allowing the emission of isochronous data packets on the identified isochronous channel of said network; and
    a means for triggering the execution of the specified task consequent upon the absence of data packets on the isochronous channel between at least two emissions of synchronization signals, the absence of packets being indicative of the state of the device being monitored.

8. The network device as claimed in claim 7 wherein said network device executes the specified task.

9. The network device as claimed in claim 8 wherein the monitoring request received specifies a predetermined number of synchronization signals and in that it comprises a counter of synchronization signals, the specified task being executed when no data packet has been detected on the isochronous channel following the detection of the specified number of synchronization signals.

10. The network device as claimed in claim 8 under the dependence of claim 8 wherein it comprises a means for emitting a handling signal following the reception of a monitoring request.

11. The network device as claimed in claim 10 wherein it comprises a means for disabling the handling of a monitoring request, said means for disabling the handling of a monitoring request being activated when the means of receiving senses a signal for handling said request by another device of the network.

12. The network device as claimed in claim 7 wherein it comprises a means of display of an alert message activated by the absence of data packets on the isochronous channel between at least two emissions of synchronization signals.

\* \* \* \* \*